United States Patent
Serra et al.

(10) Patent No.: US 7,827,857 B2
(45) Date of Patent: Nov. 9, 2010

(54) METHOD FOR ESTIMATING THE CRANK ANGLE AT WHICH 50% OF THE FUEL MASS HAS BEEN BURNT IN A CYLINDER OF AN INTERNAL COMBUSTION ENGINE WITH SPONTANEOUS MIXTURE IGNITION

(75) Inventors: Gabriele Serra, Lazzaro Di Savena (IT); Savino Luigi Lupo, Bologna (IT)

(73) Assignee: Magneti Marelli Powertrain S.p.A., Corbetta (IT)

( * ) Notice: Subject to any disclaimer, the term of this patent is extended or adjusted under 35 U.S.C. 154(b) by 286 days.

(21) Appl. No.: 12/177,922

(22) Filed: Jul. 23, 2008

(65) Prior Publication Data
US 2009/0095060 A1 Apr. 16, 2009

(30) Foreign Application Priority Data
Jul. 25, 2007 (EP) .................................. 07425457

(51) Int. Cl.
*G01M 15/06* (2006.01)
(52) U.S. Cl. .................................................. 73/114.26
(58) Field of Classification Search .............. 73/114.02, 73/114.03, 114.04, 114.13, 114.15, 114.24, 73/114.25, 114.26, 114.27
See application file for complete search history.

(56) References Cited

U.S. PATENT DOCUMENTS

| | | | |
|---|---|---|---|
| 5,200,899 A | 4/1993 | Ribbens et al. | |
| 6,363,318 B1 | 3/2002 | Wang et al. | |
| 6,866,024 B2 * | 3/2005 | Rizzoni et al. | 123/430 |
| 2003/0167118 A1 * | 9/2003 | Rizzoni et al. | 701/101 |
| 2007/0144487 A1 | 6/2007 | Nonogaki | |

FOREIGN PATENT DOCUMENTS

| | | |
|---|---|---|
| DE | 10 2004 048133 A1 | 4/2006 |
| EP | 1 052 488 A | 11/2000 |
| WO | WO2007/063177 A | 6/2007 |

OTHER PUBLICATIONS

EPO, Extended EP Search Report for EP 09 16 8056, mailed Nov. 19, 2009, all pages.
EPO, EP Search Report for EP 07425457.4, mailed on Apr. 3, 2008, all pages.

* cited by examiner

*Primary Examiner*—Eric S McCall
(74) *Attorney, Agent, or Firm*—FSP LLC

(57) ABSTRACT

An estimation method of the crank angle at which 50% of the fuel mass has been burnt in a cylinder of an internal combustion engine with spontaneous ignition of the mixture provided with a drive shaft coupled to a phonic wheel presenting a number N of teeth; the method contemplates the steps of: reading the passage of each tooth of the phonic wheel in front of a sensor; determining the angular speed of the drive shaft at each tooth event of the phonic wheel; determining at least one harmonic of the speed signal; determining an inverse mechanical model of the transmission; determining at least one torque harmonic by applying the inverse mechanical model to the speed signal harmonic; determining an algebraic function which puts a combustion index into relation with the phase of the $n^{th}$ torque harmonic; and determining the combustion index by applying the algebraic function to the $n^{th}$ torque harmonic.

15 Claims, 2 Drawing Sheets

METHOD FOR ESTIMATING THE CRANK ANGLE AT WHICH 50% OF THE FUEL MASS HAS BEEN BURNT IN A CYLINDER OF AN INTERNAL COMBUSTION ENGINE WITH SPONTANEOUS MIXTURE IGNITION

PRIORITY CLAIM

This application claims priority under 35 USC 119 AND/OR 35 USC 365 to European application no. 07425457.4 filed on Wednesday, Jul. 25, 2007, which is presently pending.

TECHNICAL FIELD

The present invention relates to a method for estimating the crank angle at which 50% of the fuel mass has been burnt in a cylinder of an internal combustion engine with spontaneous mixture ignition.

BACKGROUND ART

In internal combustion engines with controlled mixture ignition (i.e. in internal combustion engines operating according to the "Otto" cycle and fed with gasoline, methane, LPG or the like) it has been known for many years to use as control magnitude the MFB50 (50% Mass Fraction Burnt) combustion index which represents the crank angle at which 50% of the fuel mass has been burnt inside a cylinder. Indeed, in an internal combustion engine with controlled mixture ignition, the starting instant of combustion (i.e. the sparking instant of the ignition spark) is certainly and accurately known and is chosen beforehand by the engine control strategy by means of the spark advance control.

Instead, in internal combustion engines with spontaneous mixture ignition (i.e. in internal combustion engines operating according to the "Diesel" cycle and fed with oil or similar) the MFB50 combustion index is not used as control magnitude due to the considerable difficulties in estimating such MFB50 combustion index efficiently (i.e. with sufficient accuracy), effectively (i.e. rapidly and without employing excessive calculation power) and cost-effectively (i.e. without requiring the installation of additional components with respect to those normally present).

Currently, pressure sensors capable of directly measuring the pressure inside the cylinders are used to determine the MFB50 combustion index; however, such pressure sensors are very expensive and present a limited reliability in time and are thus only suitable for laboratory tests and not for an extensive use on standard production cars.

DISCLOSURE OF INVENTION

It is the object of the present invention to provide a method for effectively, efficiently and cost-effectively estimating the crank angle at which 50% of the fuel mass has been burnt in a cylinder of an internal combustion engine with spontaneous mixture ignition.

According to the present invention, there is provided a method for estimating the crank angle at which 50% of the fuel mass has been burnt in a cylinder of an internal combustion engine with spontaneous mixture ignition as claimed in the attached claims.

BRIEF DESCRIPTION OF THE DRAWINGS

The present invention will now be described with reference to the accompanying drawings which illustrate a non-limitative embodiment thereof, in which.

PREFERRED EMBODIMENTS OF THE INVENTION

Figure 1:
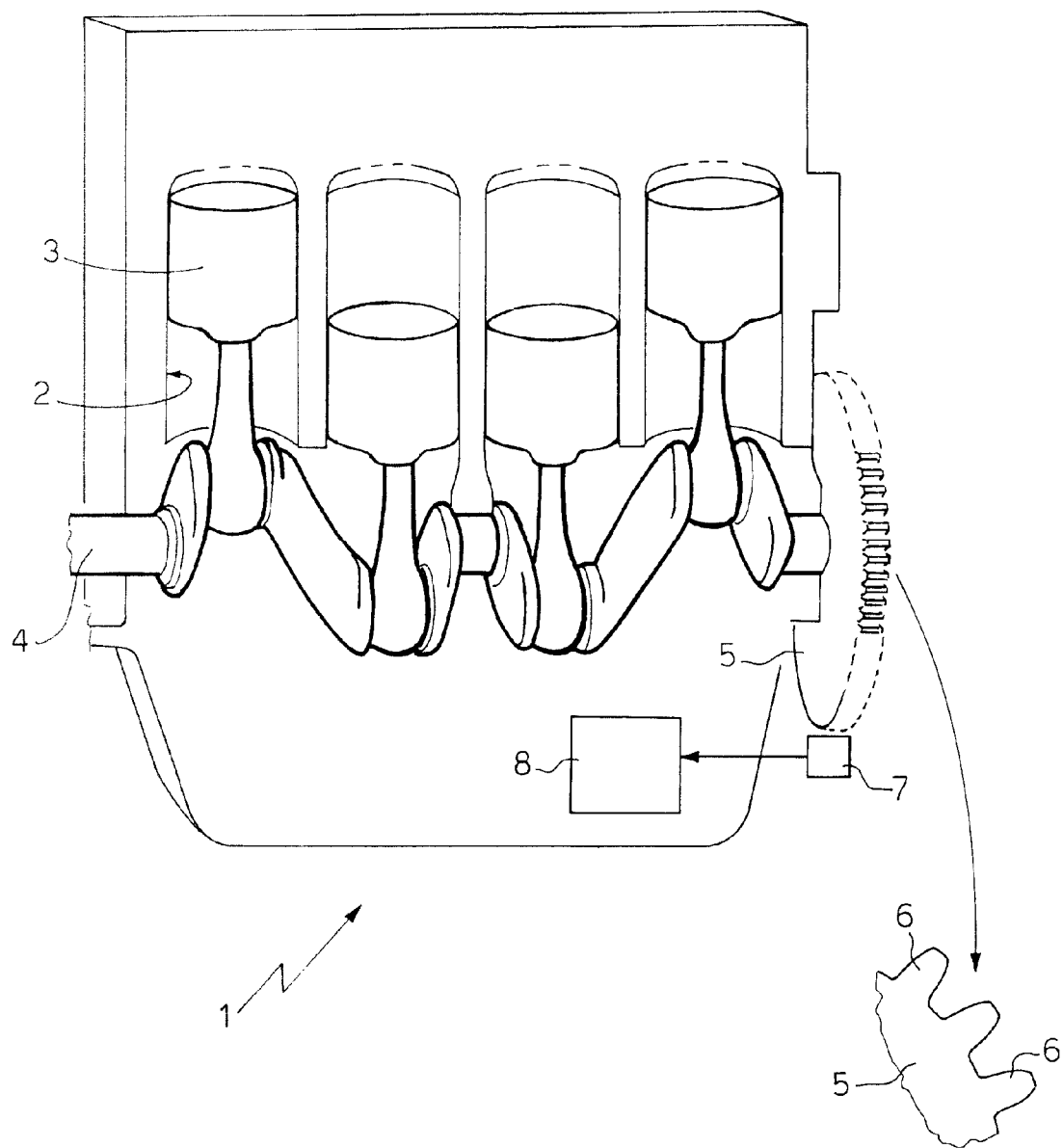
FIG. 1 is a diagrammatic view of an internal combustion engine provided with a control unit which implements the estimating method objective of the present invention.

In FIG. 1, numeral 1 indicates as a whole an internal combustion engine fed with oil (i.e. operating according to the Diesel cycle which contemplates the spontaneous ignition of the mixture) and mounted aboard a road vehicle (not shown) which is provided with a transmission line (not shown) for transmitting the torque generated by the internal combustion engine 1 to the ground. The internal combustion engine 1 comprises four cylinders 2, each of which accommodates a corresponding piston 3 mechanically connected by means of a connecting rod to a drive shaft 4 for transmitting the force generated by the combustion inside the cylinder 2 to the drive shaft 4 itself.

A phonic wheel 5 provided with a number N (e.g. 60) of teeth 6 is keyed onto the drive shaft 4 and is coupled to a sensor 7, which is adapted to detect the time elapsed between the passage of two consecutive teeth 6. The teeth 6 of the phonic wheel 5 are equally spaced out except for one pair of teeth 6 which are reciprocally arranged at a greater distance than the others to constitute a singularity which allows to accurately identify each tooth 6 and thus the angular position of the phonic wheel 5 (i.e. of the drive shaft 4). The engine 1 further comprises a control unit 8 which is connected to the sensor 7 and is adapted to estimate, for each cylinder 2, the corresponding MFB50 (50% Mass Fraction Burnt) combustion index which represents the crank angle at which 50% of the fuel mass has been burnt inside the cylinder 2.

Figure 2:
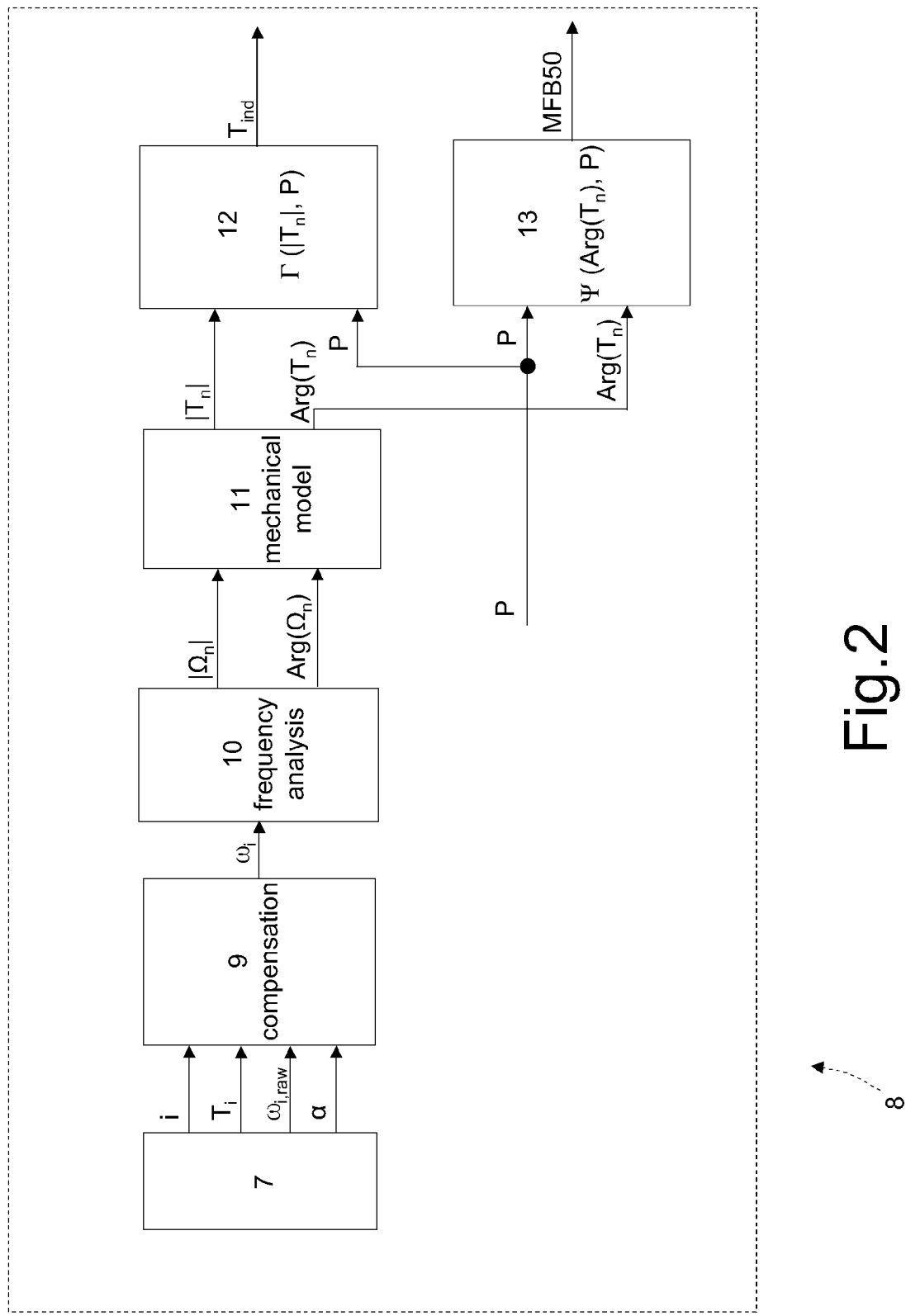
FIG. 2 is a block chart which illustrates the operation of the control unit in FIG. 1 for estimating the MFB50 combustion index.

With reference to FIG. 2, there is described the mode used by the control unit 8 to estimate the MFB50 combustion index in each cylinder 2 by using the information provided by the sensor 7 coupled to the phonic wheel 5.

As previously mentioned, the phonic wheel 5 is provided with a number N (e.g. 60) of teeth 6, which are equally spaced out except for one pair of teeth 6 which are reciprocally arranged at a greater distance than the others to constitute a singularity which accurately allows to identify each tooth 6; in this manner, each tooth 6 is identified by a characteristic sequential number i included between 1 and N.

The sensor 7 detects the number i of the current tooth 6 ($i^{th}$ tooth), the time $T_i$ of the current tooth 6, i.e. the interval of time elapsing between the detections of the two angular events which characterize the current tooth 6, the raw angular speed $\omega_{raw,i}$ of the current tooth 6, and the drive angle $\alpha$ (i.e. the angular position of the drive shaft 4 which is comprised between 0 and $4\pi$ radians). The raw angular speed $\omega_{raw,i}$ of the $i^{th}$ tooth 6 is supplied by the following equation:

$$\omega_{i,raw} = \Delta\alpha_i / T_i$$

$\omega_{i,raw}$ raw angular speed of the $i^{th}$ tooth 6 [rad/s]

$\Delta\alpha_i$ angular amplitude of the $i^{th}$ tooth 6 [rad];

$T_i$ time of the $i^{th}$ tooth 6 [s].

The magnitudes detected by sensor 7 and listed above are transmitted to a compensation block 9, which corrects each raw angular speed $\omega_{raw,i}$ to compensate for the errors deriving from the inevitable manufacturing tolerances of the teeth 6. In principle, all teeth 6 have the same angular amplitude, but actually due to the inevitable manufacturing tolerances each tooth 6 presents a characteristic shape error, i.e. presents a characteristic angular amplitude more or less different from the theoretical angular amplitude; consequently, the angular speeds $\omega_{raw,i}$ are afflicted by an intense noise which makes their use without an appropriate compensation practically impossible. In order to compensate for the shape errors of teeth 6, there is stored a vector $(\delta\mu_1, \delta\mu_2, \ldots, \delta\mu_i, \ldots, \delta\mu_N)$ composed of N compensation values $\delta\mu_i$, each of which is associated to a corresponding $i^{th}$ tooth 6 and represents the difference between the actual angular amplitude of the $i^{th}$ tooth 6 and the theoretic amplitude of the $i^{th}$ tooth 6.

The corresponding compensated angular speed $\omega_i$ is calculated for each tooth 6 in the compensation block 9 by using the following equation:

$$\omega_i = (\Delta\alpha_i + \delta\mu_i)/T_i$$

$\omega_i$ compensated angular speed of the $i^{th}$ tooth 6 [rad/s];
$\Delta\alpha_i$ angular amplitude of the $i^{th}$ tooth 6 [rad]
$\delta\mu_i$ compensation value $\delta\mu_i$ of the $i^{th}$ tooth 6 [rad]
$T_i$ time of the $i^{th}$ tooth 6 [s].

The calibration mode used to determine the compensation values $\delta\mu_i$ of the teeth 6 is described below. The calibration mode contemplates calculating the raw angular speed $\omega_{raw,i}$ of the $i^{th}$ tooth 6 by using the above-described equation and calculating the average angular speed $\omega_{raw,i}$ per revolution of the $i^{th}$ tooth 6 by means of a moving average filter on N values of the raw angular speeds $\omega_{raw,i}$ sequence; it is important to observe that the moving average filter on N values of the raw angular speeds $\omega_{raw,i}$ sequence introduces a phase delay equal to N/2 tooth intervals to the average angular speeds $\omega_{av,i}$. Subsequently, the delayed speed error $\Delta\omega_{i-N/2}$ is calculated for the $i^{th}$ tooth 6 by using the following equation:

$$\Delta\omega_{i-N/2} = \omega_{av,i} - \omega_{raw,i-N/2}$$

$\Delta\omega_{i-N/2}$ delayed speed error of the $i-N/2^{th}$ tooth 6 [rad/s];
$\omega_{av,i}$ average angular speed per revolution of it tooth 6 [rad/s] presenting a phase delay equal to N/2 tooth intervals;
$\omega_{raw,i-N/2}$ raw angular speed $\omega_{raw,i}$ of the $i-N/2^{th}$ tooth 6 [rad/s].

The raw angular speeds $\omega_{raw,i}$ sequence is intentionally delayed by a phase delay equal to N/2 tooth intervals to equal the phase delay introduced by the moving average filter.

Subsequently, the delayed angular error $\delta\alpha_{i-N/2}$ for the $i^{th}$ tooth 6 is determined by using the following equation:

$$\delta\alpha_{i-N/2} = \Delta\omega_{i-N/2} * T_{i-N/2}$$

$\delta\alpha_{i-N/2}$ delayed angular error of the $i-N/2^{th}$ tooth 6 [rad];
$\Delta\omega_{i-N/2}$ delayed angular speed of the $i-N/2^{th}$ tooth 6 [rad/s];
$T_{i-N/2}$ time of the $i-N/2^{th}$ tooth 6 [s]

Finally, the delayed angular errors vector $\delta\alpha_{i-N/2}$ may be used either to determine (in the case of first absolute calibration operation) or to update the compensation values vector $\delta\mu_i$. According to a preferred embodiment, before actually using a delayed angular errors vector $\delta\alpha_{i-N/2}$, it is checked that each delayed angular error $\delta\alpha_{i-N/2}$ of the vector itself is lower as absolute value than an acceptability threshold which indicates the maximum possible tolerance to the shape of the teeth 6; only if each delayed angular error $\delta\alpha_{i-N/2}$ of the vector is lower as absolute value than the acceptability threshold may the delayed angular errors vector $\delta\alpha_{i-N/2}$ actually be used. If a compensation value vector $\delta\mu_i$ is updated, it is preferably used a weighed average between the previous compensation values $\delta\mu_i$ and the corresponding delayed angular errors $\delta\alpha_{i-N/2}$ which normally assigns a higher weight to the previous compensation values $\delta\mu_i$ (e.g. higher the value as higher is the confidence in the previous compensation values $\delta\mu_i$). For example, the following equation could be used:

$$\delta\mu_{i,j} = K*(\delta\alpha_i - \delta\mu_{i,j-1}) + \delta\mu_{i,j-1}$$

$\delta\mu_{i,j}$ updated $i^{th}$ compensation value [rad];
k non-dimensional weight included between 0 and 1;
$\delta\alpha_i$ $i^{th}$ angular error [rad];
$\delta\mu_{i,j-1}$ previous $i-1^{th}$ compensation value [rad]

Preferably, the above-described calibration operation for determining/updating the compensation values vector $\delta\mu_i$ is performed only in presence of certain circumstances, e.g. when the internal combustion engine 1 is in cut-off phase and the revolution speed of the drive shaft 4 is included in a certain calibration range so that the reciprocating, indicated inertial torques approximately are balanced with the internal combustion engine 1 in cut-off phase.

The compensated angular speeds $\omega_i$ calculated by the compensation block 9 are supplied to an analysis block 10, in which a frequency analysis of the known type is performed on the compensated angular speeds $\omega_i$ to determine at least one speed signal harmonic $\Omega_n$. The harmonic generic $\Omega_n$ of the $n^{th}$ speed signal is always a complex number, characterized by its own module $|\Omega_n|$ and its own phase $Arg(\Omega_n)$.

The harmonics $\Omega_n$ of the speed signal calculated by the analysis block 10 are supplied to a calculation block 11, in which there is implemented an algorithm based on an inverse mechanical model of the transmission which is symbolically indicated by the equation $H(j\omega) = T/\Omega$ and represents, in the $\omega$ frequency domain, the relation between the Fourier transforms of the angular speed $\Omega$ and of the torque T of the internal combustion engine 1. The function $H(j\omega)$ is a complex value function and allows to obtain the $n^{th}$ torque harmonic $T_n$ by means of the equation:

$$T_n = H(j\Omega_n) * \Omega_n$$

$T_n$ $n^{th}$ torque harmonic;
$\Omega_n$ $n^{th}$ speed signal harmonic.

As the speed signal harmonic $\Omega_n$, the torque harmonic $T_n$ is a complex number characterized by its own module $|T_n|$ and by its own phase $Arg(T_n)$. It is important to observe that in order to be able to obtain precise estimations, the inverse mechanical model of the transmission must consider the inertial torques caused by the masses in reciprocating motion (e.g. the masses of the pistons 3).

The module $|T_n|$ of the torque harmonics $T_n$ calculated by the calculation block 11 is supplied to a calculation block 12, in which there is implemented an algebraic function $\Gamma$ which puts the average indicated torque $T_{ind}$ into relation with the module $|T_n|$ of the $n^{th}$ torque harmonic $T_n$ according to the following equation:

$$T_{ind} = \Gamma(|T_n|, P)$$

$T_{ind}$ average indicated torque $T_{ind}$;
$|T_n|$ $n^{th}$ torque harmonic module $T_n$;
P set of engineering parameters of the internal combustion engine 1.

Normally, the engineering parameters P of the internal combustion engine 1 comprise the revolution speed of the drive shaft 4 and the intake pressure (i.e. the pressure present inside an intake pipe).

The phase $Arg(T_n)$ of the torque harmonics $T_n$ calculated by the calculation block 11 is supplied to a calculation block 13, in which there is implemented an algebraic function $\Psi$ which puts the MFB50 combustion index into relation with the phase $Arg(T_n)$ of the $n^{th}$ torque harmonic $T_n$ according to the following equation:

$$MFB50 = \Psi(\text{Arg}(T_n), P)$$

MFB50 MFB50 combustion index;
Arg $(T_n)$ phase of the $n^{th}$ torque harmonic $T_n$;
P set of engineering parameters of the internal combustion engine 1.

By way of non-binding example, the equations of the direct mechanical model of the transmission in the frequency domain may be the following:

Torque engine side $$T_{e,n} = j\tilde{\omega}_e \cdot \frac{J_1 J_2 \tilde{\omega}_e^2 - (J_1 + J_2)(j\tilde{\omega}_e \rho_{eb} + K_{eb})}{J_2 \tilde{\omega}_e^2 - j\tilde{\omega}_e \rho_{eb} - K_{eb}} \cdot \omega_{e,n}$$

$$\tilde{\omega}_e = \frac{n}{2}\omega_e$$

Inertial torque $$T_{alt,n} = \frac{m_{eq} \cdot r^2}{2} \cdot \omega_e^2 \cdot e^{j\theta_{alt}}$$

Cylinder torque $$T_{ind,n} = T_{e,n} - T_{alt,n}$$

$J_1$ moment of inertia of the internal combustion engine 1;
$J_2$ moment of inertia of the vehicle referred to the drive shaft 4;
$K_{eb}$ stiffness of the transmission line;
$\rho_e b$ damping coefficient of the transmission line;
j imaginary unit;
n harmonic order;
$\omega$e pulse;
$\omega_e$ angular speed of the drive shaft 4; $T_e$ torque generated by the internal combustion engine 1;
$T_{alt,n}$ torque due to the reciprocating motion masses;
$m_{eq}$ reciprocating motion masses;
$\theta_{alt}$ inertial torque phase factor (reciprocating motion);
$T_{ind}$ average indicated torque.

The inverse mechanical model of the transmission (previously symbolically indicated by the equation $H(j\omega)=T/\Omega$) is obtained from the three equations of the direct mechanical model of the transmission shown above by replacing the first and the second equation in the third equation and so as to put the average indicated torque $T_{ind,n}$ into relation with the angular speed $\omega_{e,n}$ of the drive shaft 4; the relation between the average indicated torque $T_{ind,n}$ and the angular speed $\omega_{e,n}$ of the drive shaft 4 supplies the inverse mechanical model of the transmission (the final formula of the inverse mechanical model of the transmission is not shown because it does not add information and is complex to annotate). It is important to observe that in practice an experimental methodology is performed to experimentally obtain by points the transfer function of the inverse mechanical model of the transmission.

By way of non-binding example, the algebraic function $\Psi$ which puts the combustion index MFB50 into relation with the phase $\text{Arg}(T_n)$ of the harmonic T, of the $n^{th}$ torque could be as follows:

$$MFB50 = c_0 + c_1\Phi + c_2\Phi^2 + c_3 P\Phi + c_4 P^2\Phi$$

MFB50 combustion index;
$\Phi$ phase of the $n^{th}$ torque harmonic $T_n$;
P intake pressure;
$c_i$ coefficients.

The values of the coefficients $c_i$ may be obtained experimentally by minimising the mean square error between a series of measured values of the combustion index MFB50 and a corresponding series of estimated values of the combustion index MFB50.

By way of non-binding example, the algebraic function $\Gamma$ which puts the average indicated torque $T_{ind}$ into relation with the module $|T_n|$ of the harmonic $T_n$ of the $n^{th}$ torque could be as follows:

$$T_{ind} = b_0 + b_1|Tn| + b_2 P + b_3 N$$

$T_{ind}$ average indicated torque $T_{ind}$;
$|T_n|$ $n^{th}$ torque harmonic module $T_n$;
P intake pressure;
N revolution speed of the drive shaft 4;
$b_i$ coefficients.

The values of the coefficients $b_i$ may be obtained experimentally by minimising the mean square error between a series of measured values of the average indicated torque $T_{ind}$ and a corresponding series of estimated values of the average indicated torque $T_{ind}$.

The above-described estimation mode of the combustion index MFB50 in each cylinder 2 presents many advantages, because it is efficient (i.e. it allows to estimate the combustion index MFB50 with a considerable accuracy), effective (i.e. it allows to estimate the combustion index MFB50 rapidly and without employing excessive calculation power), and cost-effective (i.e. it does not require the installation of additional components with respect to those normally present in a modern internal combustion engine operating according to the "Diesel" cycle).

In virtue of the possibility of estimating the combustion index MFB50 in each cylinder 2, it is possible to feedback control the combustion process in virtue of which it is possible to reduce the fuel consumption and the polluting emissions, the performances being equal. For example, the combustion index MFB50 in each cylinder 2 may be advantageously used to govern the force on the connecting rods and knock phenomena.

Furthermore, the above-described estimation mode of the combustion index MFB50 in each cylinder 2 allows to obtain the average indicated torque $T_{ind}$ produced by each cylinder 2 which may be effectively used to further improve the combustion process control.

The invention claimed is:

1. An estimation method of the crank angle at which 50% of the fuel mass has been burnt in a cylinder (2) of an internal combustion engine (1) with spontaneous ignition of the mixture provided with a drive shaft (4) coupled to a phonic wheel (5) presenting a number N of teeth (6); the method comprises the steps of:
   reading the passage of each tooth (6) of the phonic wheel (5) in front of a sensor (7);
   determining the angular speed ($\omega_i$) of the drive shaft (4) at each tooth event of the phonic wheel (5);
   determining, by means of a frequency analysis the angular speeds ($\omega_i$) of the drive shaft (4), at least one harmonic ($\Omega_n$) of the speed signal characterized by its own module ($|\Omega_n|$) and is own phase ($\text{Arg}(\Omega_n)$);
   determining an inverse mechanical model ($H(j\omega)=T/\Omega$) of the transmission which represents, in the ($\omega$) frequency domain, the relation between the Fourier transforms of the angular speed ($\Omega$) and of the torque (T) of the internal combustion engine (1);
   determining at least one torque harmonic ($T_n$) characterized by its own module ($|T_n|$) and by its own phase (Arg($T_n$)) by applying the inverse mechanical model (H(jω)=T/Ω) of the transmission to the speed signal harmonic ($\Omega_n$);

determining a first algebraic function (Ψ) which puts a combustion index (MFB50) into relation with the phase (Arg($T_n$)) of the $n^{th}$ torque harmonic ($T_n$); and determining the combustion index (MFB50) by applying the first algebraic function (Ψ) to the $n^{th}$ torque harmonic ($T_n$).

2. A method according to claim 1, wherein the inverse mechanical model (H(jω)=T/Ω) of the transmission takes into account the inertial torques due to the masses in reciprocating motion of the internal combustion engine (1).

3. A method according to claim 2, wherein the first algebraic function (Ψ) depends on some engineering parameters (P) of the internal combustion engine (1).

4. A method according to claim 3, wherein the engineering parameters (P) of the internal combustion engine (1) comprise the revolution speed of the drive shaft (4) and the intake pressure.

5. A method according to claim 1 and comprising the further steps of:

determining a second algebraic function (Γ) which puts an average indicated torque ($T_{ind}$) into relation with the module (|$T_n$|) of the $n^{th}$ torque harmonic ($T_n$); and determining the average indicated torque ($T_{ind}$) by applying the second algebraic function (Γ) to the $n^{th}$ torque harmonic ($T_n$).

6. A method according to claim 5, wherein the second algebraic function (Γ) depends on some engineering parameters (P) of the internal combustion engine (1).

7. A method according to claim 6, wherein the engineering parameters (P) of the internal combustion engine (1) comprise the revolution speed of the drive shaft (4) and the intake pressure.

8. A method according to claim 1, wherein the step of determining the angular speed ($\omega_i$) of the drive shaft (4) at each tooth event of the phonic wheel (5) comprises the further steps of:

detecting the angular amplitude ($\Delta\alpha_i$) for each tooth 6;
detecting the time ($T_i$) of each tooth (6); and
determining the raw angular speed ($\omega_{raw,i}$) of each tooth (6) according to the corresponding angular amplitude ($\Delta\alpha_i$) and time ($T_i$).

9. A method according to claim 8, and comprising the further steps of:

determining for each tooth (6) a compensation value ($\delta\mu_i$) which represents the difference between the actual angular amplitude of the tooth (6) and the theoretic angular amplitude of the tooth (6); and determining the angular speed ($\omega_i$) of each tooth (6) by correcting the raw angular speed ($\omega_{raw,i}$) by means of the corresponding compensation value ($\delta\mu_i$).

10. A method according to claim 9, wherein the angular speed ($\omega_i$) of each tooth (6) is determined according to the following equation:

$$\omega_i = (\Delta\alpha_i + \delta\mu_i)/T_i$$

$\omega_i$ compensated angular speed of the $i^{th}$ tooth (6) [rad/s];
$\Delta\alpha_i$ angular amplitude of the $i^{th}$ tooth (6) [rad];
$\delta\mu_i$ compensation value $\delta\mu_i$ of the $i^{th}$ tooth (6) [rad];
$T_i$ time of the $i^{th}$ tooth (6) [s].

11. A method according to claim 9, wherein the step of determining the compensation value ($\delta\mu_i$) of each tooth (6) comprises the further steps of:

calculating the raw angular speed ($\omega_{raw,i}$) of the tooth (6);

calculating an average angular speed ($\omega_{av,i}$) per revolution of the tooth (6) by means of a moving average filter on N values of the raw angular speeds sequence ($\omega_{raw,i}$);

calculating a delayed speed error ($\Delta\omega_{i-N/2}$) of the tooth (6) as difference between the average angular speed ($\omega_{av,i}$) per revolution and the delayed raw angular speed ($\omega_{raw,i}$) of one phase delay equal to N/2 tooth intervals;

determining a delayed angular error ($\delta\alpha_{i-N/2}$) of the tooth (6) by multiplying the delayed speed error ($\Delta\omega_{i-N/2}$) of the tooth (6) by the time ($T_i$) of the tooth (6) delayed by a phase delay equal to N/2 tooth intervals; and using the delayed angular error ($\delta\alpha_{i-N/2}$) for either determining or updating the compensation value ($\delta\mu_i$) of the tooth (6).

12. A method according to claim 11, wherein the delayed speed error ($\Delta\omega_{i-N/2}$) of the tooth (6) is calculated by using the following equation:

$$\Delta\omega_{i-N/2} = \omega_{av,i} - \omega_{raw,i-N/2}$$

$\Delta\omega_{i-N/2}$ delayed angular speed of the i-N/2$^{th}$ tooth (6) [rad/s];

$\omega_{av,i}$ average angular speed per revolution of $i^{th}$ tooth (6) [rad/s] presenting a phase delay equal to N/2 tooth intervals;

$\omega_{raw,i-N/2}$ raw angular speed $\omega_{raw,i}$ of the i-N/2$^{th}$ tooth (6) [rad/s].

13. A method according to claim 11, wherein the delayed angular error ($\delta\alpha_{i-N/2}$) of the tooth (6) is calculated by using the following equation:

$$\delta\alpha_{i-N/2} = \Delta\omega_{i-N/2} * T_{i-N/(2)}$$

$\delta\alpha_{i-N/2}$ delayed angular error of the i-N/2$^{th}$ tooth (6) [rad];
$\Delta\omega_{i-N/2}$ delayed speed error of the i-N/2$^{th}$ tooth (6) [rad/s];
$T_{i-N/(2)}$ time of the i-N/2$^{th}$ tooth 6 [s].

14. A method according to claim 11, wherein a vector of N delayed angular errors ($\delta\alpha_{i-N/2}$) is used to either determine or update a compensation values vector ($\delta\mu_i$) only if each delayed angular error ($\delta\alpha_{i-N/2}$) of the vector itself is lower as absolute value than an acceptability threshold which indicates the maximum possible tolerance on the shape of the tooth (6).

15. A method according to claim 9, wherein the compensation values ($\delta\mu_i$) of the teeth (6) are either determined or updated only when the internal combustion engine (1) is in cut-off phase and the revolution speed of the drive shaft (4) is comprised in a certain calibration range so that the reciprocating, indicated inertial torques are approximately balanced with the internal combustion engine (1) in cut-off phase.

* * * * *